United States Patent [19]

Clawson et al.

[11] Patent Number: 4,775,930

[45] Date of Patent: Oct. 4, 1988

[54] ELECTRONIC KEY CHECK FOR ENSURING PROPER CRADLES INSERTION BY RESPECTIVE PROCESSING BOARD

[75] Inventors: Keith W. Clawson, Elizabeth Township, Allegheny County, Pa.; Richard D. Roberts, Fremont, Calif.

[73] Assignee: Westinghouse Electric Corp., Pittsburgh, Pa.

[21] Appl. No.: 797,318

[22] Filed: Nov. 12, 1985

[51] Int. Cl.⁴ .................. G06F 11/00; G06F 15/00
[52] U.S. Cl. .................. 364/200; 371/16; 324/73 PC; 364/580
[58] Field of Search ... 364/200 MS File, 900 MS File, 364/141, 185, 186, 187, 550, 551, 579, 580; 371/9, 15, 16, 20; 324/73 PC, 73 R, 66

[56] References Cited

U.S. PATENT DOCUMENTS

| | | | |
|---|---|---|---|
| 4,108,358 | 8/1978 | Niemaszyk et al. | 235/302 |
| 4,276,593 | 6/1981 | Hansen | 364/187 X |
| 4,363,105 | 12/1982 | Plassmeier | 364/580 |
| 4,402,055 | 8/1983 | Lloyd et al. | 364/579 |
| 4,409,635 | 10/1983 | Kraus | 364/186 X |
| 4,414,664 | 11/1983 | Greenwood | 371/20 |
| 4,468,612 | 8/1984 | Starr | 324/66 |
| 4,480,329 | 10/1984 | Gordebeke | 371/15 X |
| 4,488,299 | 12/1984 | Fellhauer et al. | 371/20 |
| 4,504,782 | 3/1985 | Zbinden | 324/73 PC |
| 4,517,639 | 5/1985 | Ferrell et al. | 471/9 X |
| 4,558,415 | 12/1985 | Znber et al. | 364/187 X |
| 4,578,773 | 3/1986 | Desai et al. | 364/900 |
| 4,610,013 | 9/1986 | Long et al. | 371/9 |
| 4,634,110 | 1/1987 | Julich et al. | 364/187 X |
| 4,675,769 | 6/1987 | Marshall et al. | 361/1 |

*Primary Examiner*—Raulfe B. Zache
*Assistant Examiner*—Thomas C. Lee
*Attorney, Agent, or Firm*—E. F. Possessky

[57] ABSTRACT

Keying check apparatus is provided for a control system including at least two microprocessor cradles, with each microprocessor cradle having a unique control program, and which keying check apparatus determines through operation with one of a first and second interrupt that the desired control program and the correct connections are provided for the CPU board of each microprocessor cradle.

3 Claims, 7 Drawing Sheets

FIG. I
PRIOR ART

ELECTRONIC KEY CHECK FOR ENSURING PROPER CRADLES INSERTION BY RESPECTIVE PROCESSING BOARD

CROSS-REFERENCE TO RELATED APPLICATIONS

The present application is related to previously filed patent applications Ser. No. 496,693, filed May 5, 1983, now U.S. Pat. No. 4,558,415, by P. A. Zuber et al. and entitled "Vehicle Speed Control Apparatus and Method", Ser. No. 675,675, filed Nov. 28, 1984, now U.S. Pat. No. 4,710,880, by P. A. Zuber and entitled "Vehicle Speed Control Apparatus and Method" and Ser. No. 609,253, filed May 11, 1984, now U.S. Pat. No. 4,625,279, by P. A. Zuber et al. and entitled "Vehicle Speed Control Apparatus and Method", and which are assigned to the same assignee as the present application; the disclosures of which are incorporated herein by reference.

BACKGROUND OF THE INVENTION

1. Field of the Invention:

The present invention relates to the provision of an electronic keying check for a microprocessor system to determine if the CPU printed circuit board is correctly operative in each system module and to determine if the correct memory devices are operative with the respective microprocessor CPU printed circuit boards.

2. Description of the Prior Art:

It is known in the prior art to individually decode the ONEs data of a provided input speed command for a transit vehicle and the ZEROs data of that input speed command from the roadway track with a pair of signal channels or cradles, and then to compare the ONEs data with the ZEROs data to detect any discrepancy as disclosed in U.S. Pat. No. 4,015,082 of T. C. Matty et al. and disclosed in above-referenced patent application Ser. No. 496,693, now U.S. Pat. No. 4,558,415, of P. A. Zuber et al.

It is known to provide a signal for each pair of cradles, which determines the operation of a propulsion and brake controller and in addition is fed back for an integrity check operation. An underspeed operation enable signal has been provided by each pair of cradles to determine the operation of the propulsion and brake controller, and in addition was fed back to the integrity check operation of the other pairs of cradles.

A general description of the microprocessors and some of the related peripheral devices as shown in FIGS. 3 and 4 of the drawings is provided in the Intel Component Data Catalog currently available from Intel Corporation, Santa Clara, Calif., 95051.

SUMMARY OF THE INVENTION

An improved microprocessor control apparatus is provided for a microprocessor system including at least two microprocessor cradles to determine for an operator if each CPU printed circuit board is coupled with the desired microprocessor cradle correctly and to determine if the correct software control program is provided in each microprocessor memory. The microprocessor CPU board includes an electronic keying check routine that establishes if the desired CPU printed circuit board for each cradle by supplying an output signal to the analog input/output board to turn on a light emitting diode, which diode light stays on throughout the provided check operation and if the correct EPROM software is operative with the desired CPU printed circuit board for a given microprocessor cradle, and after this check is satisfied the diode light will turn off. If this diode light does not turn off for a given cradle, the operator knows that the electronic keying check indicates an undesired CPU printed board connection in that cradle of an undesired EPROM memory software program operative with that microprocessor cradle.

DESCRIPTION OF THE PREFERRED EMBODIMENT

It is well known to provide vehicle speed command decoding in relation to both of the ONEs and the ZEROs information. At least one pair of speed control channels or cradles respectively perform the speed error determination operation in relation to the ONEs and ZEROs information components of the input speed command. A data integrity check can be performed in relation to the speed decoding operation of each pair of cradles. This speed command decoding operation is described in the above referenced patent application Ser. No. 496,693, filed May 5, 1983, now U.S. Pat. No. 4,558,415.

It is known to control a passenger vehicle moving along a roadway track with binary coded speed command signals received from the track, and which signals include binary logic ONE and ZERO information represented by multiple message frequencies.

Figure 1:
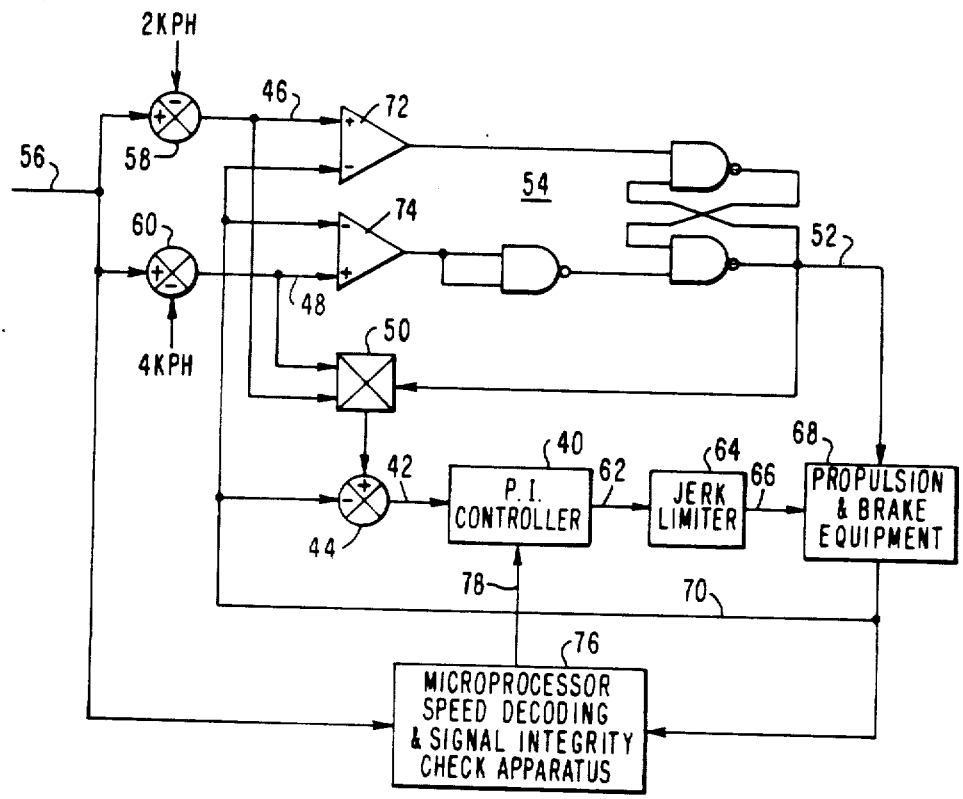
FIG. 1 shows a functional schematic of a prior art speed decoding and signal integrity check apparatus for a transit vehicle.

In FIG. 1 there is provided a functional schematic of a prior art speed decoding and signal integrity check apparatus operative to enable the effort request signal generator in a vehicle speed maintaining control apparatus, such as disclosed in U.S. Pat. No. 4,217,643 of L. W. Anderson et al. A proportional plus integral controller 40 responds to a speed error signal 42 from a comparator 44 responsive to a speed feedback signal 70 and one of a brake reference velocity signal 46 or a power reference velocity signal 48, through operation of a selector 50 that responds to the brake mode or the power mode output control signal 52 of a power and brake controller 54. An input speed command signal 56 is supplied to a first comparator 58 to provide the brake reference velocity signal 46 that is 2 KPH below the value of the speed command signal 56, and is operative with a comparator 60 to provide the power reference velocity signal 48 that is 4 KPH below the speed command signal 56.

The PI controller 40 provides an output first effort request P signal 62 to a jerk limiter 64, which provides an output second effort request P signal 66 to the propulsion and brake equipment 68 of a transit vehicle. The output signal 52 from the power and brake controller 54 is either a brake mode control signal having a zero value or a power mode control signal having a ONE VALUE. The actual speed 70 of the vehicle is fed back as an input to the power and brake controller 54. When the actual speed 70 is above the brake reference velocity signal 46, the comparator 72 causes the power and brake controller 54 to provide the brake mode control signal 52 to the propulsion and brake equipment 68. When the actual speed signal 60 is less than the power reference velocity signal 48, the comparator 74 causes the power and brake controller 54 to provide the power mode control signal to the propulsion and brake equipment 68.

The programmed microprocessor speed decoding and signal integrity check apparatus 76 is in accordance with the disclosure of U.S. Pat. No. 4,209,828 of L. W. Anderson et al., the disclosure of which is incorporated herein by reference, and which responds to the input speed command signal 56 for comparison with the vehicle actual speed signal 70 to provide an enable signal 78 to the PI controller 40 to enable the provision of the effort request signal 62 when the ZEROs data speed error signal, determined in accordance with the ZEROs data of the input speed command 56, is substantially the same as the ONEs data speed error signal.

Figure 2:
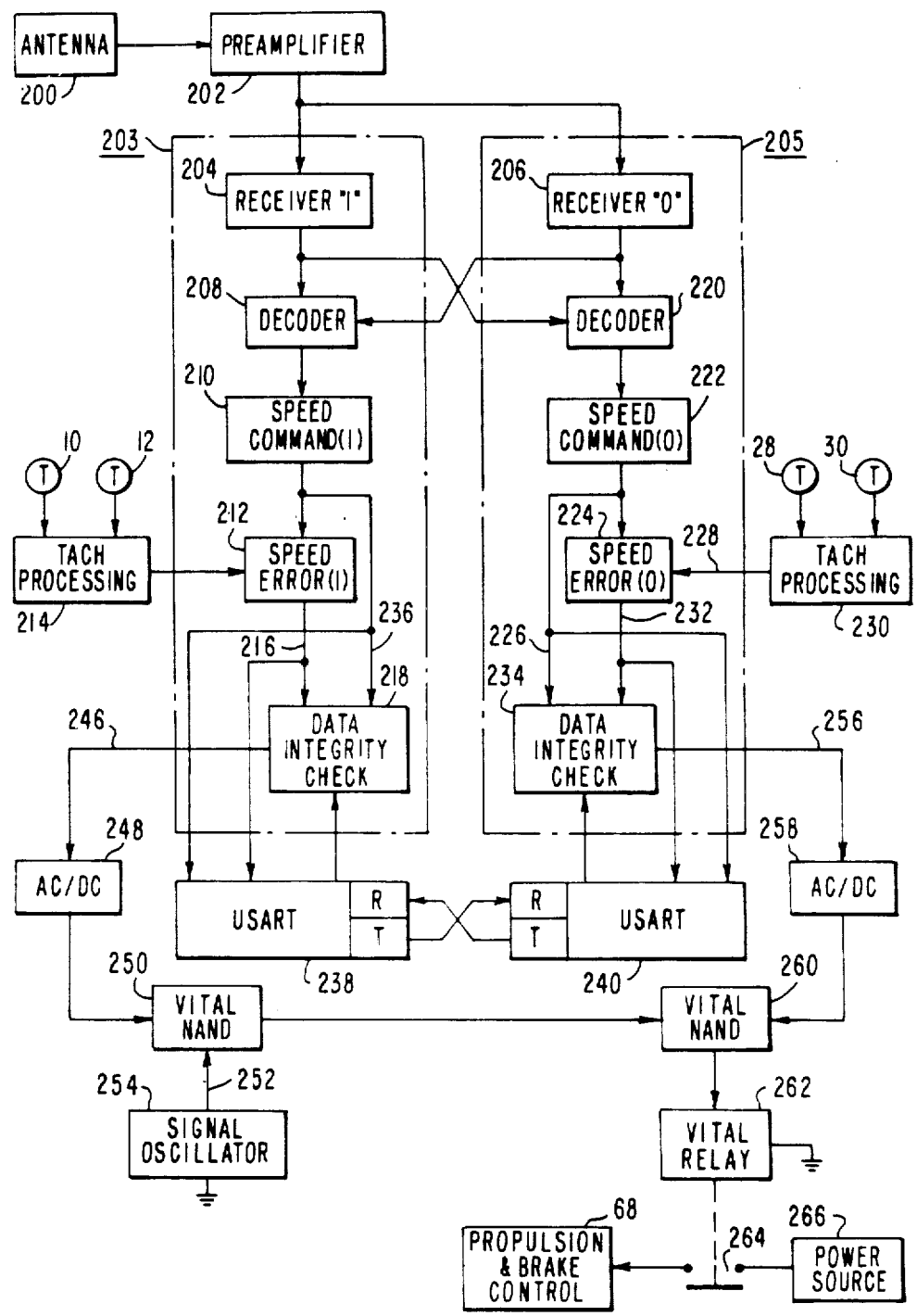
FIG. 2 shows a prior art control apparatus for a transit vehicle and including two microprocessor cradles.

In FIG. 2 there is shown a functional block diagram to illustrate the sequential operations of the prior art speed control apparatus. The vehicle carried antenna 200 senses the input speed command signal from the roadway track, and the signal strength is increased in a preamplifier 202. The signal then passes to a first microprocessor channel or cradle 203 including a receiver 204 tuned to the ONEs data component of the input speed command signal and to a second microprocessor cradle 205 including a receiver 206 tuned to the ZEROs data component of the input speed command signal. A decoder 208 within the first microprocessor cradle 203 operates to provide the speed command 236 at block 210 in relation to the ZEROs data from the receiver 206 and the ONEs data from the receiver 204. A speed error determination apparatus 202 compares the speed command for the ONEs data with the vehicle speed from the tachometers 10 and 12 which pass through a well-known tachometer processing apparatus 214 to provide the vehicle speed to the speed error determination apparatus 212. The speed error 216 and the speed command 236 are supplied to a data integrity check apparatus 218 for the ONEs data microprocessor cradle 203.

The ZEROs data signal from the receiver 206 and the ONEs data signal from the receiver 204 operate with the decoder 220 to provide the ZEROs speed command 226 at block 222. A ZEROs speed error determining apparatus 224 compares the speed command 226 with the vehicle speed 228 from a tachometer processing apparatus 230 operative with the tachometers 28 and 30 such as shown in FIG. 1. The speed error singal 232 and the speed command 226 are supplied to a data integrity check apparatus 234 for the ZEROs data microprocessor cradle 205.

The ONEs speed command signal 236 and the ONEs speed error 216 are supplied to a well-known USART apparatus 238 operative with the ones microprocessor cradle 203, and which can be an Intel 8251A Programmable communication interface apparatus which operates as a dynamic serial data link to transmit each of the ONEs speed command 236 and the ONEs speed error 216 to a similar USART communication interface 240 operative with the ZEROs data microprocessor cradle 205. The ONEs speed error 216 and ONEs speed command signal 236 are supplied through output 242 to the data integrity check apparatus 234 of the ZEROs microprocessor channel 205. Similarly, the ZEROs speed command 226 and the ZEROs speed error 232 are transmitted by the USART 240 to the USART 238 and are provided through output 244 to the data integrity check apparatus 218 for the ONEs microprocessor cradle 203. This programmable communication interface serial link apparatus can include an Intel 8251A programmable data communication apparatus and related equipment, such as is described in the Intel Component Data Catalog from the Intel Corporation, Santa Clara, Calif., 95051. It takes a finite time for this serial transmission to occur, so a balance timer delay of about 250 milliseconds is provided for the operation of the data integrity checks 218 and 234.

After the balance time delay, if the ONEs speed command 236 and the ZEROs speed command 226 in data integrity check 218 compare and are substantially the same, and if the ONEs speed error 216 and the ZEROs speed error 232 in the data integrity check apparatus 218 compare within a predetermined difference such as 5 KPH, then an output toggle signal 246 having a predetermined frequency, such as 9 hertz, is supplied through an AC to DC converter 248 to enable a vital NAND circuit 250 to pass a predetermined control signal 252 from a signal generator 254. This control signal 252 can have a predetermined frequency such as 159 hertz modulated by 109 hertz. Similarly, after the balance time delay, if the ZEROs speed command 226 compares and is substantially the same as the ONEs speed command in the data integrity check 234 and if the ZEROs speed error 232 compares within a predetermined difference such as 5 KPH with the ones speed error 216 in the data integrity check 234, then an output toggle signal 256 having a predetermined frequency such as 9 hertz, is provided through an AC to DC converter 258 to enable a vital NAND circuit 260 to pass the signal 252 from the signal oscillator 254. If each of the vital NANDS 250 and 260 are enabled in this manner to pass the signal 252, this will energize the vital relay 262 including a relay driver to close a contact 264 for energizing the propulsion and brake control 68 from the power source 266.

Figure 3:
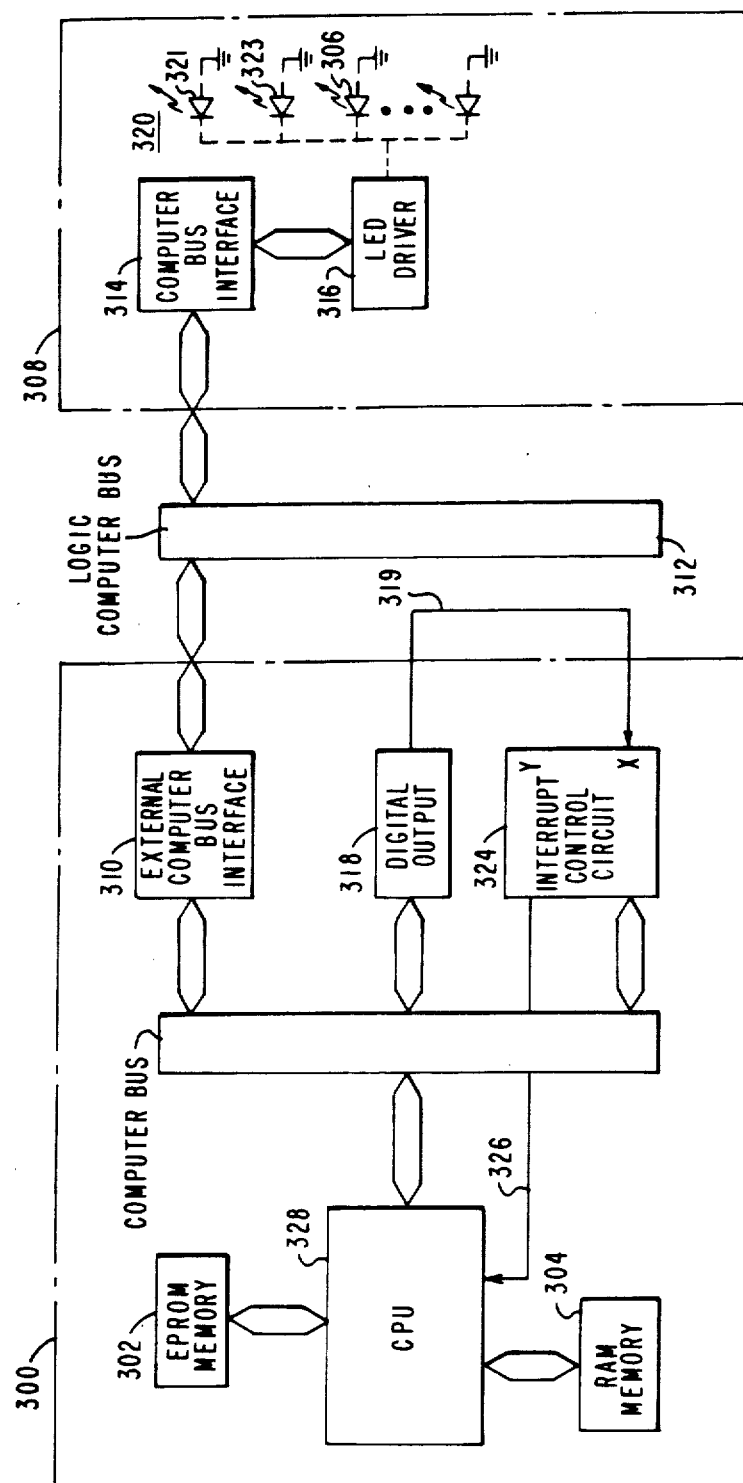
FIG. 3 shows the electronic keying check apparatus of the present invention for a first cradle of FIG. 2.
Figure 4:
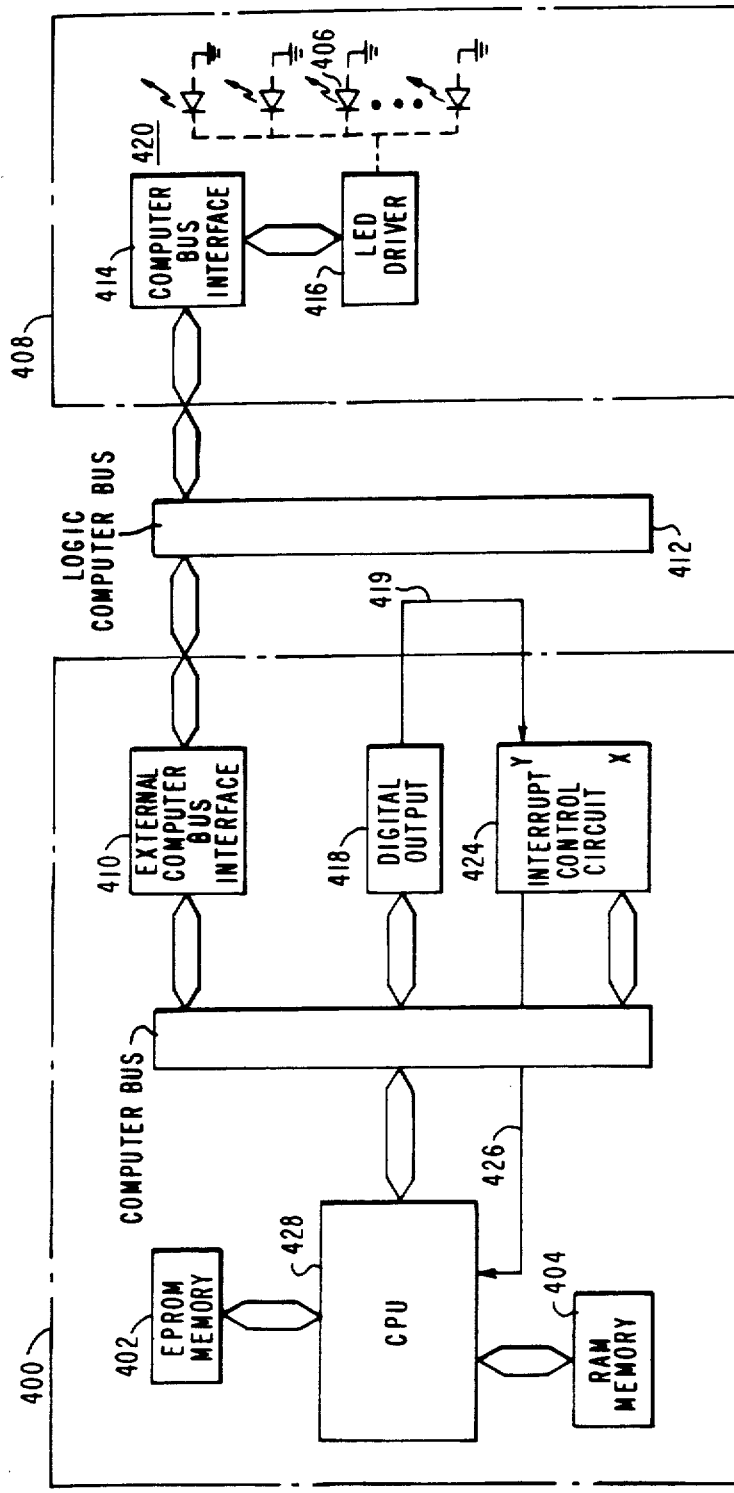
FIG. 4 shows the electronic keying check apparatus of the present invention for a second cradle of FIG. 2.

In FIG. 3 there is shown the keying check apparatus of the present invention, such as can be provided for microprocessor cradle 203 shown in FIG. 2. In FIG. 4 there is shown the keying check apparatus of the present invention, such as can be provided for the microprocessor cradle 205. Each microprocessor cradle uses a similar CPU printed circuit board, with different software control programs contained in the respective EPROM memory 302 and in EPROM memory 402 for the two cradles. Each EPROM memory is marked with a different drawing number, so care must be exercised to establish that the one EPROM memory 302 including one software control program is provided for the first cradle 203 as shown in FIG. 2 and to provide a different EPROM memory 402 including a another software control program for the second cradle 205. The normal operation control software programs, provided for the respective cradles 203 and 205 are modified to include the electronic keying check operation control software programs of the present invention.

To establish that the correct software program and the desired CPU board are operating with cradle 203, an electronic keying check operation is provided for that cradle, which first turns on a light emitting diode 306 on the analog input/output printed circuit board 308 to indicate that this keying check is operating. The CPU board 300 for cradle 203, using data lines and address lines, sends out read and write control signals. These signals go through the external computer bus interface 310, the logic computer bus 312 and the computer bus interface 314 of the analog I/O board 308 to energize an LED driver 316 to turn on the LED 306. It is well known that the cradle 203 contains several additional printed circuit boards not shown in FIG. 3. Only the CPU printed circuit board 300 used for the electronic keying check of the present invention is shown in FIG. 3. The LED 306 will stay on throughout the respective present keying check operation in relation to the CPU board 300, and until this keying check is passed satisfactorily at which time the respective LED device 306 will be turned off. If the CPU board 300 does not pass this test, the LED 306 will remain turned on as a diagnostic aid for the operator to indicate that CPU board 300 does not have the desired software program or is not correctly positioned in its cradle and needs to be corrected.

A plurality of light emitting diodes 320 shown in FIG. 3 indicate several sequential operations of the CPU board 300. For example, a first light 321 will be turned on to indicate that a RAM test is operating. Then the first light 321 will turn off when the RAM test is completed, and a second light 323 will turn on to indicate the check sum test is operating which well known check sum test is made of the EPROM memory 302 to determine that desired communication can be made with this memory. The startup operation of the CPU board 300 functions to step through this series of tests, and one of the provided tests is the electronic keying check of the present invention for which the LED 306 is turned on. If the lighted LED 306 circuit board 300 including the software program in the EPROM memory 302 is positioned and operating correctly. If the lighted LED 306 stays on, the operator should look at the involved cradle 203 to determine if the CPU board 300 is positioned into the desired slot and to determine if the desired EPROM 302 is coupled with the CPU board 300. The electronic keying check operation is an integral part of the control software provided in the EPROM 302, and every time the CPU board 300 power is turned on or every time the CPU program is restarted, the operation will go through this electronic keying check operative with the LED 306.

The electronic keying check, when the desired EPROM memory 302 is provided for the CPU board 300, operates to toggle a signal from a digital output 318 on the CPU board 300, which signal is coupled through a wire connection 319 to an X input of an interrupt control circuit 324 to provide an X interrupt acknowledge signal 326 to the CPU 328 when the CPU board 300 correctly placed in the cradle 203 to be coupled with the wire connection 319. When the CPU board 300 is not correctly placed in the cradle 203, the digital output 318 does not provide a toggle signal and is not coupled with the wire connection 319 such that the toggle signal from the digital output 318 is not received by the X input of the interrupt control circuit 324.

In FIG. 4 there is shown the keying check apparatus of the present invention, such as can be provided for microprocessor cradle 205 shown in FIG. 2. To establish that the cradle software program is operating with cradle 205, an electronic keying check is provided which first turns on a light emitting diode 406, on the analog input/output printed circuit board 408 to indicate that this keying check is operating. The CPU board 400, using data lines and address lines, sends out read and write control signals. For cradle 205 these signals go through the external computer bus interface 410, the logic computer bus 412 and the computer bus interface 414 of the analog I/O board 408 to energize an LED driver 416 to turn on the LED 406. The LED 406 will stay on throughout the respective present keying check operation in relation to the CPU board 400, and until this keying check is passed satisfactorily at which time the respective LED device 406 will be turned off. If the CPU board 400 does not pass this test, the LED 406 will remain turned on as a diagnostic aid for the operator to indicate that CPU board 400 does not have the desired software program or is not correctly positioned in its cradle and needs to be corrected.

A plurality of light emitting diodes 420 shown in FIG. 4 indicate several sequential operations of the CPU board 400. The start-up operation of the CPU board 400 functions to step through this series of tests, and one of the provide tests is the electronic keying check of the present invention for which the LED 406 is turned on. If the lighted LED 406 turns off, then the operator knows that the CPU printed circuit board 400 including the software program in the EPROM memory 402 is positioned and operating correctly. If the lighted LED 406 stays on, the operator knows the start-up procedure did not sequence through all of the lighted LED devices 420 including the LED 406, and the operator should look at the involved cradle 205 to determine if the CPU board 400 is correctly positioned into the desired slot of the cradle 205 and to determine if the desired EPROM 402 is coupled with the CPU board 400. The electronic keying check operation is an integral part of the control software provided in the EPROM 402, and every time the CPU board 400 power is turned on or every time the CPU program is restarted the operation will go through this electronic keying check operative with the LED 406.

When the CPU board 400 has a correct physical placement in the cradle 205, the electronic keying check operates to toggle a signal from digital output 418 on the CPU board 400, which signal is coupled through a wire connection 419 to an upper Y input of an interrupt control circuit 424. When the CPU board 400 does not have a correct physical placement in the cradle 205, a signal is not toggled to the upper input of the interrupt control circuit 424 and does not provide a Y interrupt acknowledge signal 426 to the CPU 428.

Figure 5:
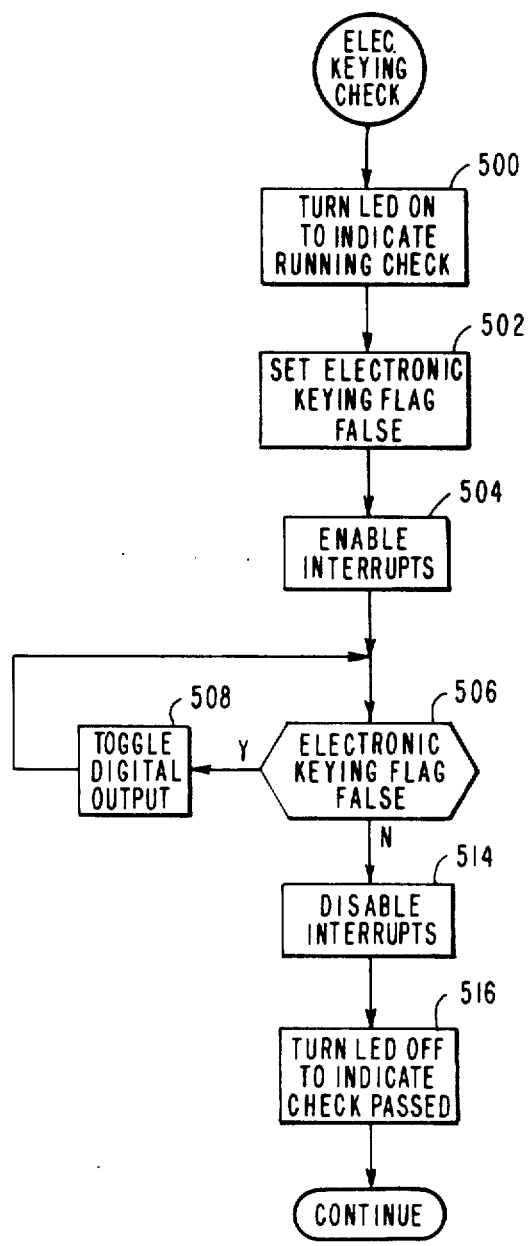
FIG. 5 shows a flow chart of the present electronic keying check program for the CPU board of the first cradle of FIG. 2.
Figure 7:
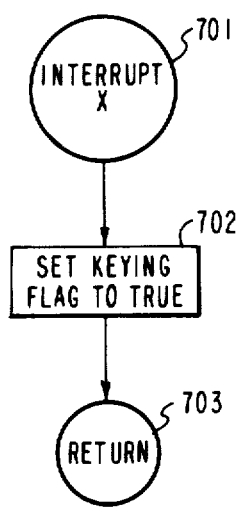
FIG. 7 shows the interrupt routine provided for FIG. 5 when an X interrupt is received.

In FIG. 5 there is shown a flow chart of the electronic keying check program of the present invention provided in the EPROM memory 302 of the cradle 203. For each start up or restart of the CPU board 300 this keying check program operates. At block 500 the LED 306 on the analog I/O board 308 is turned on. AT block 502 an electronic keying flag is set to indicate a false state. At block 504 the previously disabled interrupts are enabled so the electronic keying check can be performed. Then a wait loop is provided, including at decision block 506 a determination to see if the electronic keying flag is false, and if it is false, which it would be the first time through the program, this keying check operation is not passed. At block 508 the digital output 318 is toggled on the CPU board 300. When an interrupt occurs, the execution of the main keying check program will be stopped when the interrupt occurs, and the interrupt routine will be executed. Once the interrupt routine is finished, the execution of the main keying check program will continue. If an interrupt X is acknowledged, the interrupt routine shown in FIG. 7 is provided, and the keying flag is set true. Once the digital output has been toggled, the operation loops back to the decision block 506. When this decision operation at block 506 is satisfactorily passed with the electronic keying flag set true, at block 514 the interrupts are disabled and at block 516 the LED 306 on analog I/O board 308 is turned off to indicate that this electronic keying check is passed.

Figure 6:
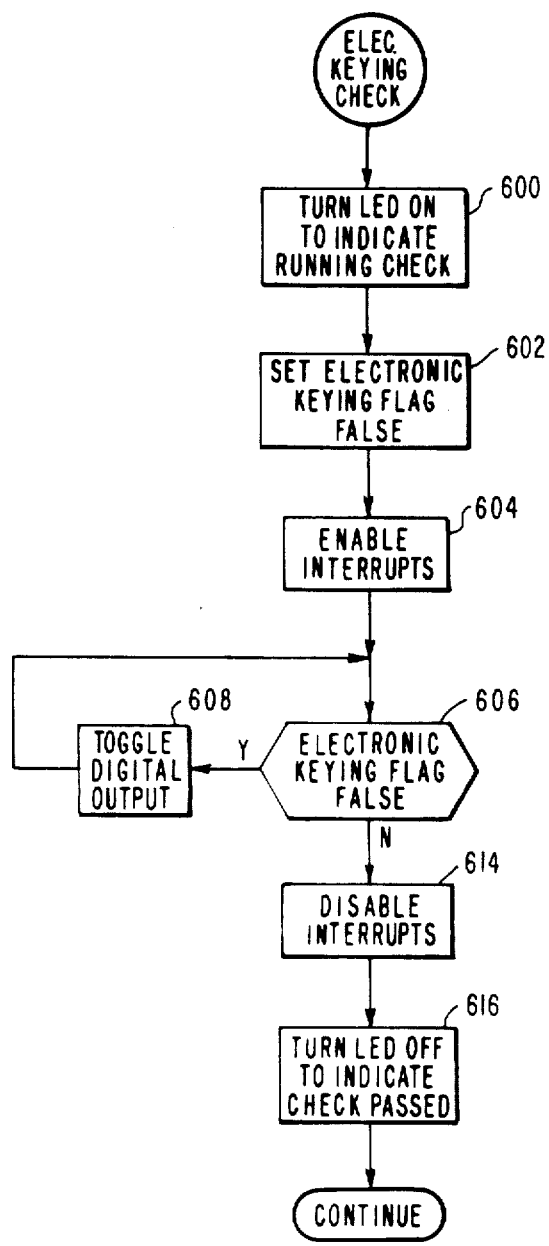
FIG. 6 shows a flow chart of the present electronic keying check program for the CPU board of the second cradle of FIG. 2.
Figure 9:
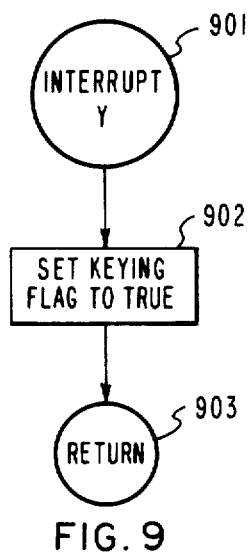
FIG. 9 shows the interrupt routine provided for FIG. 6 when a Y interrupt is received.
Figure 10:
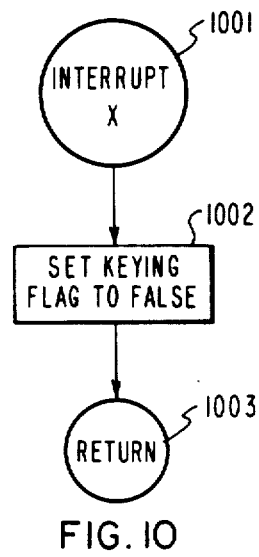
FIG. 10 shows the interrupt routine provided for FIG. 6 when an X interrupt is received.

In FIG. 6 there is shown a flow chart of the electronic keying check program of the present invention provided in the EPROM memory 402 of the cradle 205. For each start up or restart of the CPU board 400 this keying check program operates. At block 600 the LED 406 on the analog I/O board 408 is turned on. At block 602 an electronic keying flag is set to indicate a false state. At block 604 the previously disabled interrupts are enabled so the keying check can be performed. At decision block 606 a determination is made to see if the keying flag is false. If yes, at block 608 the digital output 418 is toggled on the CPU board 400. When an interrupt occurs, the execution of the main keying check program will be stopped when the interrupt occurs, and the interrupt routine will be executed. Once the interrupt routine is finished, the execution of the main keying check program will continue. If an interrupt Y is acknowledged, the interrupt routine shown in FIG. 9 is provided, and the keying flag for the CPU 428 is set true. After the digital output is toggled, the program then loops directly back to decision block 606. When the keying flag is determined at block 606 to be set true, at block 614 the interrupts are disabled and at block 616 the LED 406 on the analog I/O board 408 is turned off to indicate this keying check is passed and that the control software in EPROM 402 for cradle 205 is correct and that the cradle 205 to provide the signal to interrupt Y. If the electronic keying check software in the EPROM 402, which is intended for the channel 205, is incorrectly provided in CPU board 300, then the interrupt X is energized by the digital output 318, and the routine in the flow chart of FIG. 10 included with the EPROM 402 will not set the keying flag true and will indicate to the operator an undesired operation. If the CPU board 400 is in the wrong connection slot of the microprocessor cradle 205, there is no wiring connection made to the interrupt Y so the signal from the digital output 418 will not energize either of the interrupts X or Y and the electronic keying check program shown in FIG. 6 operative with CPU board 400 will remain in the wait loop including the blocks 606 and 608.

Figure 8:
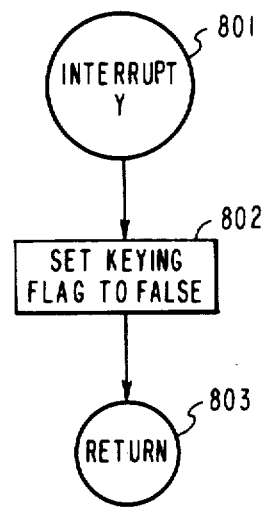
FIG. 8 shows the interrupt routine provided for FIG. 5 when a Y interrupt is received.

If the electronic keying check software of EPROM 302 is incorrectly provided in the CPU board 400, the interrupt Y of the interrupt control circuit 424 will be energized by the digital output 418, and the routine in the program of FIG. 8 included with the EPROM 302 will not set the keying flag true and will indicate to the operator an undesired operation.

If the CPU board 300 is correctly coupled into the right slot of the microprocessor cradle 203 and if the correct control software in the EPROM 302 is provided for the CPU board 300, the interrupt X will be provided and the routine in FIG. 7 will set the keying flag true and the program operation at block 506 will sense the electronic keying flag is true and the program operation will jump out of the wait loop to blocks 514 and 516, which turns off the LED 306 on the analog I/O board 308.

If the CPU board 402 is correctly coupled into the right slot of the cradle 205 and if the correct control software in EPROM 402 is provided for the CPU board 400, the interrupt Y will be provided and the routine in FIG. 9 will set the keying flag true, which block 606 will sense and the program operation will jump to block 614 and 616 to turn off the LED 406 on the analog I/O board 408.

A practical embodiment of the present invention was made and successfully operated, using the following components:
  EPROM memory—Intel 2764
  RAM memory—IDT 6116
  CPU—Intel 8086
  Digital output—TI54LS373
  Interrupter Control Circuit—Intel 8259
  LED driver—TI54LS374

For the example of the control apparatus shown in FIG. 3, the interrupt circuit 324 operated to tell the CPU 328 if interrupt X received the toggle signal from the digital output 318. The CPU 328 then stopped running the keying check program if interrupt X was received and ran the first interupt X routine that set the keying flag true or otherwise ran a second interrupt Y routine that set the keying flag false and then the operation returned to the keying check program.

For the example of the control apparatus shown in FIG. 4, the interrupt circuit 424 operated to tell the CPU 428 if interrupt Y received the toggle signal from the digital output 418. The CPU 428 then stopped running the keying check program and in response to the interrupt Y being received ran a first interrupt Y routine that set the keying flag true or otherwise ran a second interrupt X routine that set the keying flag false and then the operation returned to the keying check program.

We claim:
1. A microprocessor system having:
   at least a first microprocessor cradle and a second microprocessor cradle;
   a first CPU board having first CPU means applying a first key signal to first cradle wiring when said first board is inserted in a first designated slot in said first cradle for electrical connections including connection to said first cradle wiring;
   a second CPU board having second CPU means applying a second key signal to second cradle wiring when said second board is inserted in a second designated slot in said second cradle for electrical connections including connection to said second cradle wiring;
   said first CPU means having first key control means responsive to a first interrupt signal generated by said first CPU board in response only to said first key signal to make said first CPU board operational if said first CPU is inserted in said first slot in said first cradle and connected to said first cradle wiring; and said second CPU means having second key control means responsive to a second interrupt signal generated by said second CPU board in response only to said second key signal to make said second CPU board operational if said second CPU board is inserted in said second slot in said second cradle and connected to said second cradle wiring.

2. The control apparatus of claim 1, with the first control means being a first software program operating with the first CPU means, and
   with the second control means being a second software program operating with the second CPU means.

3. The control apparatus of claim 1,
   with the first CPU means including a first digital output connected to a first interrupt control circuit of said first CPU board for providing the first interrupt signal, and
   with the second CPU means including a second digital output connected to a second interrupt control circuit of said second CPU board for providing the second interrupt signal.

* * * * *